United States Patent [19]
Shirley et al.

[11] Patent Number: 5,870,191
[45] Date of Patent: Feb. 9, 1999

[54] APPARATUS AND METHODS FOR SURFACE CONTOUR MEASUREMENT

[75] Inventors: Lyle G. Shirley, Boxboro; Michael S. Mermelstein, Cambridge, both of Mass.

[73] Assignee: Massachusetts Institute of Technology, Cambridge, Mass.

[21] Appl. No.: 600,216

[22] Filed: Feb. 12, 1996

[51] Int. Cl.$^6$ ............................. G01B 9/02; G01B 11/24
[52] U.S. Cl. ......................... 345/356; 356/357; 356/358; 356/359; 356/349; 356/376
[58] Field of Search ................................... 356/345, 357, 356/359, 360, 353, 349, 358

[56] References Cited

U.S. PATENT DOCUMENTS

| | | | |
|---|---|---|---|
| 4,139,304 | 2/1979 | Redman et al. | 356/358 |
| 4,781,455 | 11/1988 | Mächler et al. | 356/34 |
| 4,832,489 | 5/1989 | Wyant et al. | 356/359 |
| 5,455,670 | 10/1995 | Payne et al. | 356/5.1 |

FOREIGN PATENT DOCUMENTS

| | | |
|---|---|---|
| 2554086 | 6/1977 | Germany. |
| 58-173412 | 10/1983 | Japan. |
| 61-198009 | 9/1986 | Japan. |
| 2142427 | 1/1985 | United Kingdom. |

OTHER PUBLICATIONS

Butters, Von J. N., "Using the Laser to Measure Length," *Materialprüf,* 24:245–248 (Jul. 7, 1982).

Zou et al., "Two–Wavelength DSPI Surface Contouring Through the Temperature Modulation of a Laser Diode," *Optik,* 94(4):155–158 (1993).

Peng et al., "A Simplified Multi–Wavelength ESPI Contouring Technique Based on a Diode Laser System," *Optik,* 91(2)81–85 (1992).

Fercher et al., "Two–Wavelength Speckle Interferometric Technique for Rough Face Contour Measurement," *Optical Engineering,* 25(5):623–626 (May 1986).

Fercher et al., "Rough Surface Interfermotery with a Two–Wavelength Heterodyne Speckle Interferometer," *Applied Optics,* 24(14):2181–1288 (Jul. 15, 1985).

Thalmann et al., "Dimensional Profiling by Electronic Phase Measurement," *SPIE Industrial Laser Interferometry,* 746:61–68 (1987).

Takeda et al., "Fourier–Transform Speckle Profilometry: Three–Dimensional Shape Measurements of Diffuse Objects with Large Height Steps and/or Spatially Isolated Surfaces," *Applied Optics,* 33(34):7829–7837 (Dec. 1, 1994).

Volotovskaya, N.K., "Relationship Between the Frequency and Angular Correlation Function of a Signal that is Scattered by an Extensive Body," *Radio Engineering and Electronic Physics J.* 16(6):1048–1049 (Jun. 1971).

Dresel et al., "Three–Dimensional Sensing of Rough Surfaces by Coherence Radar," *Applied Optics,* 31(7):919–925 (Mar. 1, 1992).

(List continued on next page.)

*Primary Examiner*—Frank G. Font
*Assistant Examiner*—Amanda Merlino
*Attorney, Agent, or Firm*—Testa, Hurwitz & Thibeault, LLP

[57] ABSTRACT

Apparatus and methods of measuring position information, typically the depth coordinate, of a point on the surface of an object. In one embodiment, the apparatus includes two sources of radiation positioned to illuminate the point on the surface of the object with radiation from each of the sources. The radiation from each of the sources is coherent with respect to the radiation from the other source. A control system changes the phase of the radiation from at least one of the sources relative to the phase of the radiation from the other source as measured at the point on the surface of the object. A detector is positioned to receive radiation scattered by the point and a processor, in communication with the detector, calculates position information in response to the change in phase of the radiation from the source and the received radiation scattered by the point on the surface of the object.

50 Claims, 10 Drawing Sheets

OTHER PUBLICATIONS

Shirley, L. G., "Applications of Tunable Lasers to Laser Radar and 3D Imaging," *Technical Report 1025, Massachusetts Institute of Technology, Lincoln Laboratory,* (1995).

Shirley et al., "Advanced Techniques for Target Discrimination Using Laser Speckle," *Massachusetts Institute of Technology, The Lincoln Laboratory J.,* 5(3):367–440 (1992).

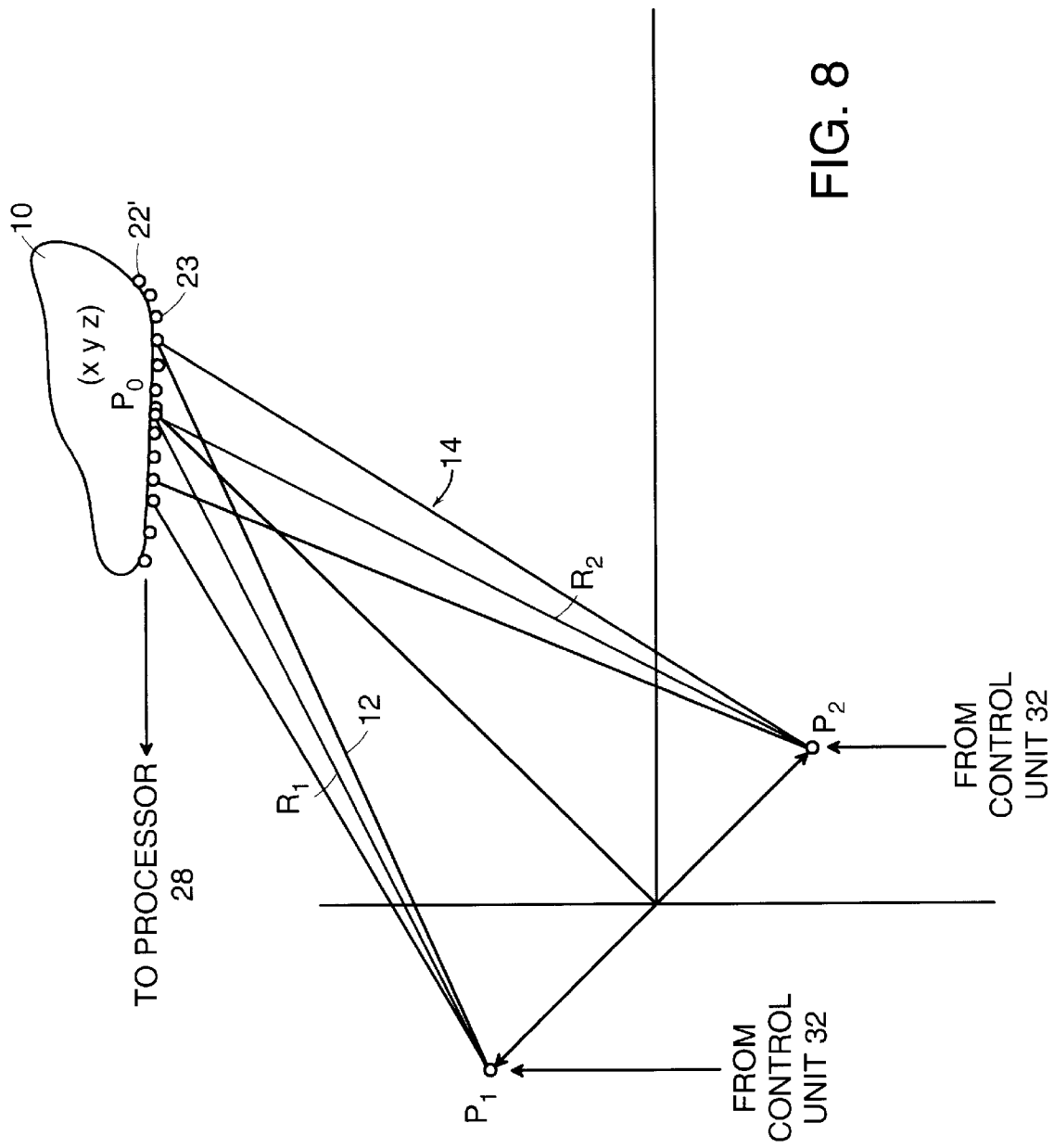

APPARATUS AND METHODS FOR SURFACE CONTOUR MEASUREMENT

GOVERNMENT SUPPORT

This invention was made with government support under Contract Number F19628-90-C-0002 awarded by the Air Force. The government has certain rights in the invention.

FIELD OF THE INVENTION

The invention relates to the field of surface measurement and, more specifically, to the field of non-contact surface measurement.

BACKGROUND OF THE INVENTION

Dimensional metrology, the measurement of the size and shape of objects, is very important in today's manufacturing environment in which machines perform much of the fabrication and assembly of complex objects composed of many subassemblies. The shape and size of each component in a complex assembly, such as an automobile, must be held to close tolerances to ensure that the components fit together properly.

Ideally such measurements of shape and size are accomplished without physical contact in order to save time in making the measurement. Many non-contact measurement methods make use of available machine vision systems. The measurement of surface contour information is an especially difficult problem in machine vision systems since depth information is often lost or is difficult to interpret. To compensate for the loss of depth information and the difficulty in interpreting the information which is available, many machine vision systems utilize light to create moire patterns on the surface of the object in order to obtain contour information.

Interferometric methods have also been used when detailed measurements of the surface are needed. Although Interferometric systems provide surface contour information, they are sensitive to vibrations in both the object being measured and the source of illumination being used. The present invention is less sensitive to the vibration problem that has affected previous systems.

SUMMARY OF THE INVENTION

The invention relates to an apparatus for determining position information of a point on the surface of an object. In one embodiment, the apparatus includes two sources of radiation positioned to illuminate the point with the radiation from each of the sources. The radiation from each of the sources is coherent with respect to the radiation from the other source. In one embodiment, the two sources of radiation are formed by splitting a coherent radiation beam, which may be accomplished with the use of a beam splitter or a fiber optic splitter.

A control system in communication with one or more of the sources changes the phase of the radiation from one of the sources relative to the phase of the radiation from the other source as measured at the point on the surface of the object. In one embodiment, in which the radiation source is a frequency tunable laser, the control system controls the tunable laser to emit coherent radiation of a changing frequency. In another embodiment, in which one or more of the radiation sources is moveable, the phase of its radiation with respect to the phase of the radiation from the other source as measured at the point on the object, is varied by moving one or more of the sources.

A detector, in communication with a processor, is positioned to receive incident radiation scattered from the point on the surface of the object. In one embodiment, the detector is an array of individual photodetector elements. In a further embodiment, the array of photodetector elements is a charge coupled device (CCD).

In a preferred embodiment, a focusing system is positioned between the detector and the surface of the object to focus the image of the surface of the object onto the image plane of the detector. A polarizing filter may be placed between the focusing system and the detector, with the optical axis of the polarizer aligned with the principal axis of polarization of the radiation emitted by the two sources, in order to remove any scattered light which has been depolarized and thus, which would degrade the signal to noise ratio of the system.

The processor, which may also be in communication with the controller, calculates position information in response to the relative change in phase of radiation from two sources as adjusted by the control system, which adjustment causes changes in intensity of the radiation scattered by the point on the surface of the object that is received by the detector. In one embodiment, the processor is a single processor operating on detector output signals associated with each of the photodetector elements of the detector array. In another embodiment, the processor is a multiprocessor, with each photodetector element or some subset of elements of the photodetector array in communication with a respective processor or some subset of processors of the multiprocessor. In yet another embodiment utilizing a CCD array, a plurality of CCD elements is in communication with a respective processor of the multiprocessor. Use of the multiprocessor arrangements advantageously enhances signal processing speed.

The invention also relates to a method for determining position information of a point on the surface of an object. The method includes the steps of providing two or more sources of radiation illuminating the point to be measured, changing the phase of the radiation from at least one of the sources relative to the phase of the radiation from the other source as measured at the point on the surface of the object, detecting radiation scattered by the point on the surface of the object, and calculating position information from the resulting changes in intensity of the radiation scattered by the point on the surface of the object. In one embodiment, the change in phase of radiation from one of the sources relative to the phase of radiation from the other source as measured at the point on the object is accomplished by using a frequency tunable source of radiation, such as a tunable laser. In another embodiment, in which one or more of the sources is moveable, the relative phase of radiation from the two sources is changed as measured at the point on the object by moving such source or sources.

In another embodiment, the apparatus for determining position information of a point on the surface of an object includes two sources of radiation positioned to illuminate the point on the object to be measured with the radiation from each of the sources. A control system, in communication with at least one of the sources of radiation, changes the phase of the radiation from one source relative to the phase of radiation from the other source as measured at the point on the surface of the object. In one embodiment, the phase of radiation from one of the sources is changed relative to the phase of radiation of the other source as measured at the point on the object by adjusting a frequency tunable laser. In another embodiment, the phase of radiation from one of the sources is changed relative to the phase of radiation from the other source as measured at the point on the object by moving one or more moveable laser sources. A detector positioned at the point on the surface of the object to be measured receives the radiation illuminating the point. In one embodiment, the detector is positioned on the end of a spring arm which undergoes movement in accordance with the surface contour of the object as the spring arm is moved over the surface of the object. A processor, in communication with the detector, calculates position information of the point on the surface of the object in response to the change in phase of the radiation from the source as adjusted by the control system and the radiation received at the point on the surface of the object.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 8 is a block diagram of another embodiment of the invention for making surface contour measurements;

DESCRIPTION OF THE PREFERRED EMBODIMENT

While describing the embodiment of the invention, reference will be made to "sources" and "sources of radiation." These terms are meant to refer to any source of radiation, including highly localized sources of radiation.

Figure 1:
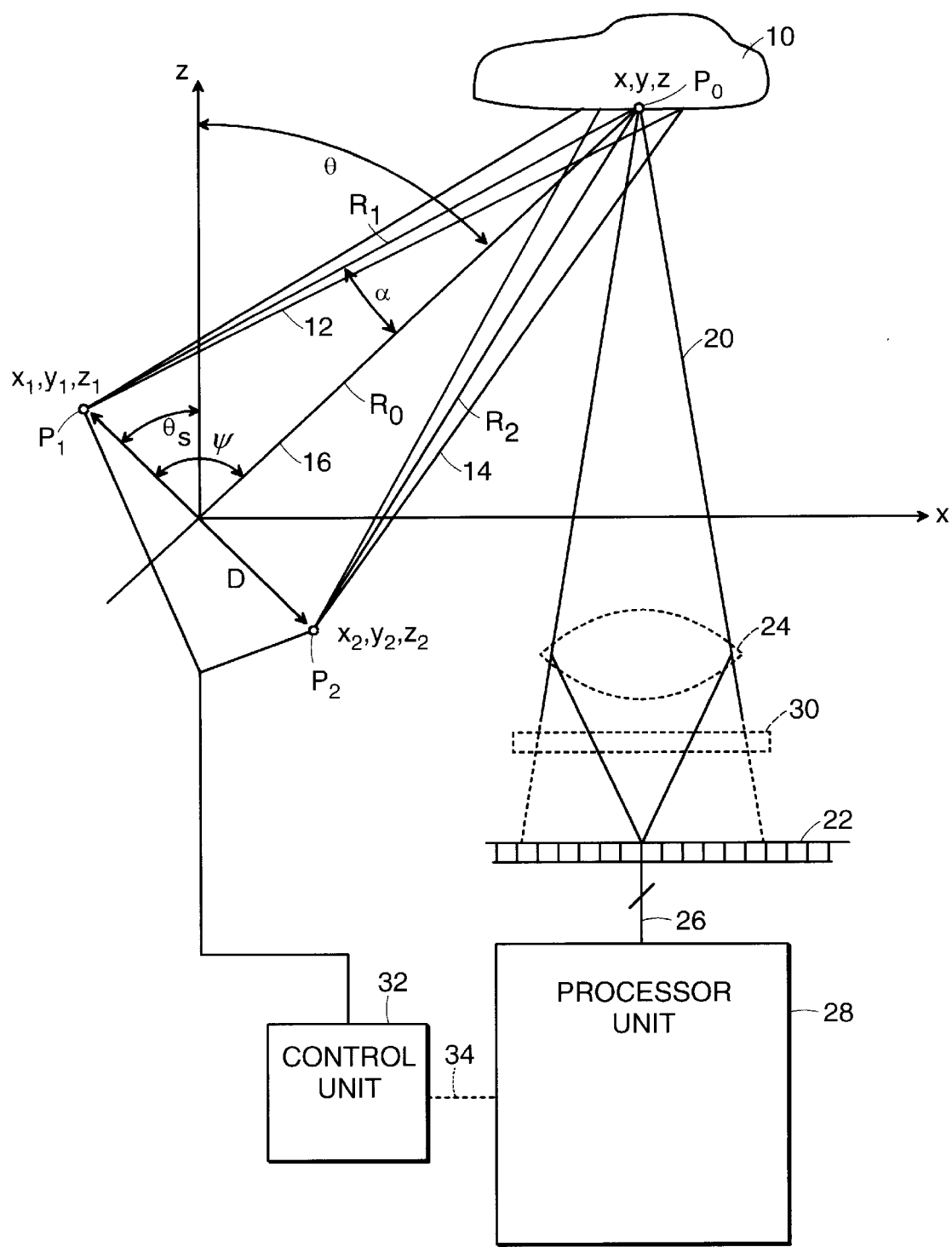
FIG. 1 is a block diagram of an embodiment of the invention for making surface contour measurements.

Referring to FIG. 1, and in brief overview, two sources of radiation $P_1$ and $P_2$ are separated by a fixed distance D and have spatial coordinates of $(x_1,y_1,z_1)$ and $(x_2,y_2,z_2)$, respectively. The radiation from each of the sources $P_1$ and $P_2$ is coherent with respect to the radiation from the other one of the sources. Each source, $P_1$ and $P_2$, directs its respective divergent beam of radiation 12 and 14 toward a point $P_0$ on the surface of an object 10. The distance from each respective source of radiation, $P_1$ and $P_2$, to the point on the surface $P_0$ is indicated by $R_1$ and $R_2$, respectively. $\psi$ is the angle between the line extending from the origin to the point $P_0$ and the line extending between sources $P_1$ and $P_2$, $\theta_s$ is the angle between the z axis and the line extending between the sources $P_1$ and $P_2$, and a is the half angle subtended by the source points as viewed from $P_0$. Each beam 12, 14 is substantially polarized in the same direction as the other beam 14, 12 and may be independently scannable to simultaneously illuminate different regions on the object 10. Alternatively, the entire object 10 may be illuminated simultaneously.

Light scattered 20 by the point $P_0$ is detected by a photodetector 22. In one embodiment, the photodetector 22 comprises an array of photodetector elements providing a two dimensional image of the object 10 to be measured. In a further embodiment, the array of photodetector elements is a charge coupled device (CCD). The detector 22 provides an output signal 26 comprising one or more individual signals, each one associated with a corresponding one of the photodetector elements of the detector 22.

In a preferred embodiment, a focusing element 24 is positioned between the point $P_0$ on the surface of the object 10, and the photodetector 22, so as to image the illuminated portion of the object including point $P_0$ onto the detector 22. Because of the roughness of the surface of the object, and because the illuminating radiation is coherent, the focused image will be speckled. The output signal 26 from the photodetector 22 is the input signal to a processor unit 28.

A polarizer 30, in one embodiment, is placed between the focusing element 24 and the detector 22. Polarizer 30 is oriented in a direction to maximize its coincidence with the principal polarization component of the scattered light 20, so as to improve the speckle contrast. With this arrangement, the signal-to-noise ratio associated with light scattered from the surface of the object 10 is maximized.

In one embodiment, the processor 28 is a single processor which operates on detector output signals 26 associated with each of the photodetector elements of the detector array 22. In another embodiment, the processor 28 is a multiprocessor having a plurality of individual processors and each photodetector element provides an input signal to a respective one of the processors. In yet another embodiment, in which the detector 22 is a CCD array, a plurality of the CCD elements provide an input signal to a respective processor of a multiprocessor. With the multiprocessor arrangements, computations on signals from a plurality of individual photoelements occur substantially simultaneously, thereby enhancing the signal processing speed.

A control unit 32 controls the operation of the sources of radiation, $P_1$ and $P_2$, so as to change the phase of the radiation of one of the sources relative to the phase of the radiation from the other source as measured at the point $P_0$ on the surface of the object 10. The processor 28 may be in communication with control unit 32 via signal line, or bus 34. For example, in certain applications it may be desirable for the processor 28 to process signals from the detector 22 at specific times relative to the scanning of the sources $P_1$ and $P_2$ over the surface of the object 10 or relative to the rate at which the frequency of the radiation from the sources is swept. Since such scanning and frequency sweeping operations are controlled by control unit 32, communication between the control unit 32 and the processor 28 is desirable in these circumstances. It will be appreciated that the control unit 32 and the processor 28 may be physically separate units or, alternatively, may be implemented by a single processing system.

Figure 2:
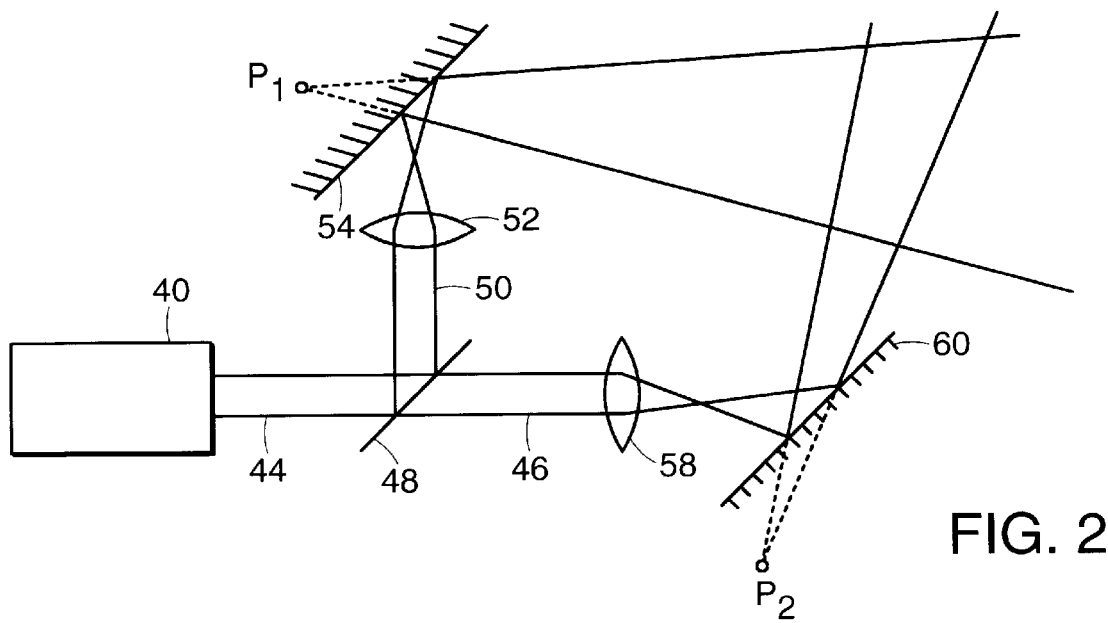
FIG. 2 is a block diagram of an embodiment of the two sources of radiation shown in FIG. 1.

Referring now to FIG. 2, in one embodiment the sources of radiation $P_1$ and $P_2$ are formed from the radiation emitted from a tunable laser 40. The radiation beam 44 emitted by the tunable laser 40 is split by a beam splitter 48. The radiation beam 50 reflected by the beam splitter 48 is caused to diverge by a lens 52. The divergent beam is then reflected by a moveable aiming mirror 54. The radiation beam reflected by the aiming mirror 54 provides one of the sources of coherent radiation, $P_1$. Similarly, the radiation beam 46 passing through the beam splitter 48 is caused to diverge by a lens 58 which directs the divergent beam to a second moveable aiming mirror 60. The radiation beam reflected by mirror 60 provides the second source of radiation, $P_2$. Aiming mirrors 54 and 62 may be pivotable to selectively illuminate the surface of object 10. They may also be moveable to vary the positions of sources $P_1$ and $P_2$.

Figure 2A:
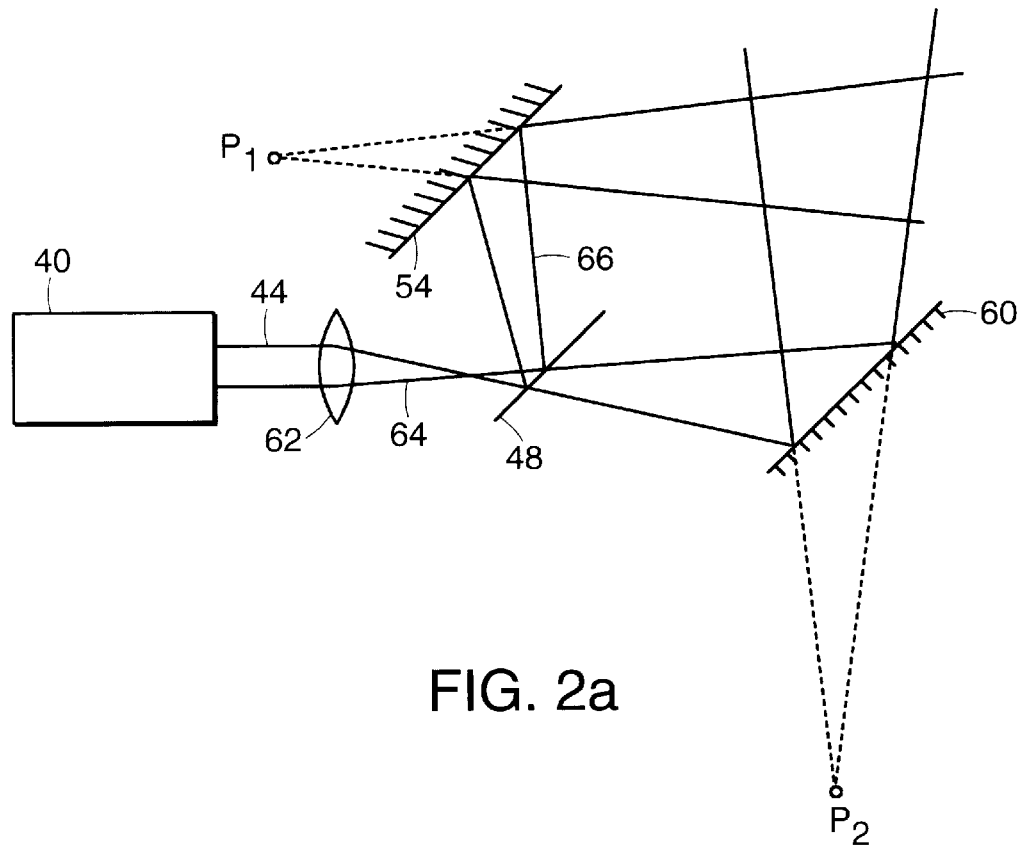
FIG. 2a is a block diagram of another embodiment of the two sources of radiation shown in FIG. 1.

Referring to FIG. 2a, another embodiment of the sources of radiation $P_1$ and $P_2$ is shown to include a tunable laser source 40 providing a beam of radiation 44. The radiation beam 44 passes through a lens 62 which causes the beam to diverge, providing divergent beam 64. Divergent beam 64 is then reflected by beam splitter 48 to provide a first beam 66. A second beam 68 passes through the beam splitter 48, as shown. Moveable aiming mirrors 54 and 60 reflect beams 66 and 68 to provide sources $P_1$ and $P_2$, respectively.

Figure 2B:
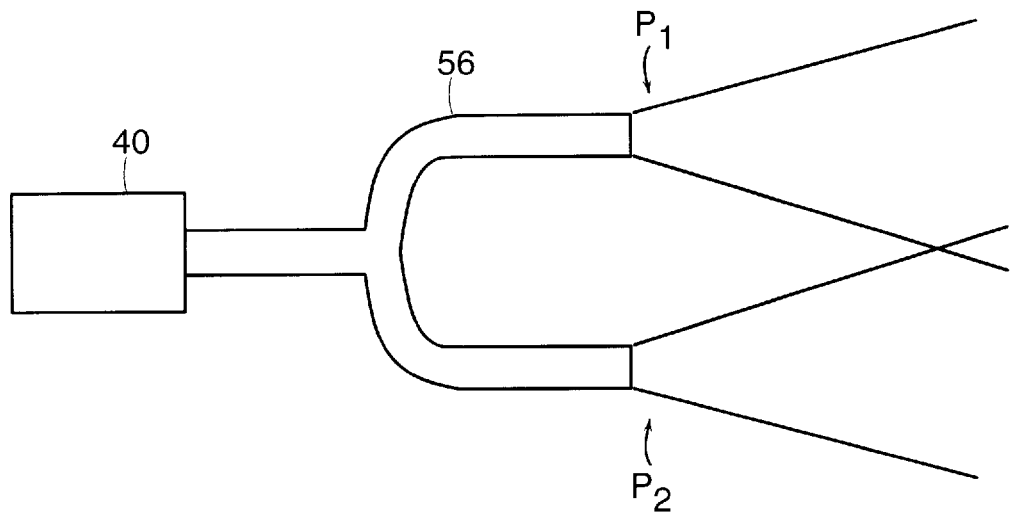
FIG. 2b is a block diagram of yet another embodiment of the two sources of radiation shown in FIG. 1.

Referring to FIG. 2b, in another embodiment the sources of radiation $P_1$ and $P_2$ are split from the radiation emitted from a tunable laser 40 using a fiber optic splitter 56. Fibers may have beam-forming elements at their end to control or set the divergence angle of the two beams, and in one embodiment the beam-forming elements may be lenses. Sources $P_1$ and $P_2$ may alternatively be formed from a pair of tunable lasers which are frequency locked together. Other suitable embodiments of radiation sources include any sources which generate a wave having a controllable phase, such as microwaves and sonic waves.

In one embodiment, the sources of radiation $P_1$ and $P_2$ are maintained at a fixed distance D from one another by attaching each source to one end of a bar comprised of a material having a small coefficient of expansion. In another embodiment, the sources of radiation $P_1$ and $P_2$ are not held at a fixed distance but instead the distance between them, D, is known to a high degree of accuracy.

Figure 3:
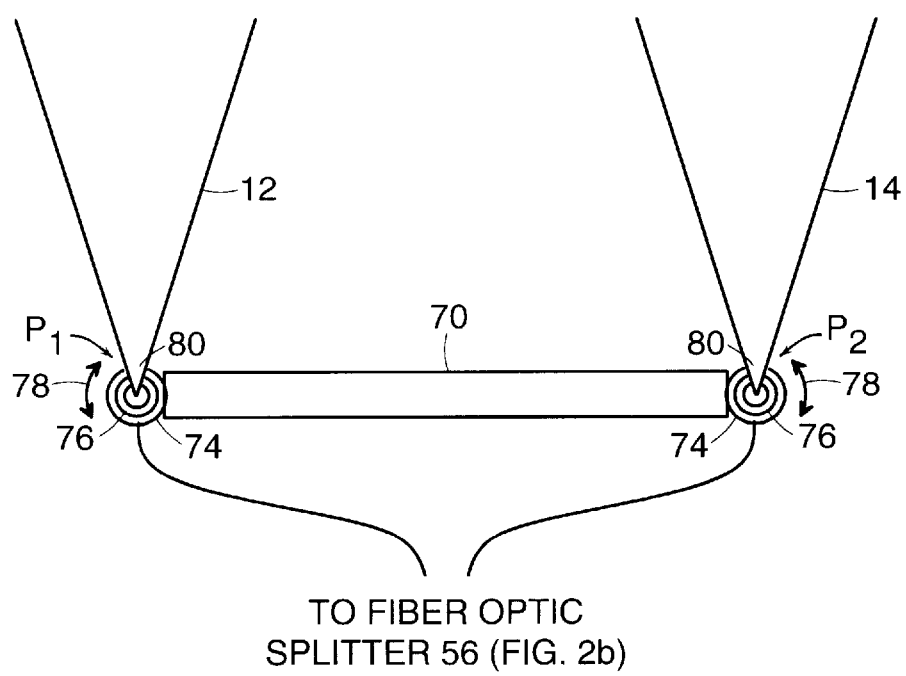
FIG. 3 is a block diagram of an embodiment of apparatus for supporting the two sources of radiation of FIG. 1 at a fixed distance relative to one another.

One illustrative bar 70 for supporting radiation sources $P_1$ and $P_2$ at a fixed distance D relative to one another is shown in FIG. 3. A bar 70 is provided with sockets 74 at opposite ends thereof A ball joint 76 is pivotally positioned within each of the sockets 74, as shown. Each of the ball joints 76 has an end of a fiber from a fiber optic splitter 56 (shown in FIG. 2b) positioned therein and an aperture 80 through which divergent radiation passes. Fibers may have beam-forming elements at their end to control or set the divergence angle of the two beams and in one embodiment the beam forming elements are lenses. In operation, the ball joints 76 are pivotable as shown by arrows 78 within the respective socket 74 and may be under the control of control unit 32 (shown in FIG. 1). With this arrangement, the divergent beams 12 and 14 provided by the sources $P_1$ and $P_2$ at the ends of the fibers can be directed as desired to illuminate all, or a portion, of the object 10 including the point $P_0$ to be processed, while maintaining a fixed separation distance D.

The coordinates of point $P_0$ on the surface of object 10 are (x,y,z). Although the x and y coordinates of $P_0$ are generally directly determinable from the geometry of the detector 22 and the object 10, taking into account any magnification by intervening focusing element 24, the depth coordinate z, where the z axis is defined as being parallel to the optical axis of the imaging system, is not directly obtainable. The depth coordinate, z, however can be measured by first considering the difference in path length $$s = R_2 - R_1 + S_0 \tag{1}$$

from the radiation sources $P_1$ and $P_2$ to the point $P_0$ on the surface of the object 10. The quantity $S_0$ is included to account for any path length difference in the beams that may occur before they reach points $P_1$ and $P_2$.

If s is non-zero, then changing the frequency of the radiation emitted from sources $P_1$ and $P_2$ will result in the phase of the radiation from one source, as measured at point $P_0$, changing with respect to the other source. This phase change results in a modulation of intensity of the radiation at point $P_0$. The change in frequency, $\Delta v$, required to complete one cycle of a change in intensity is given by the expression:

$$\Delta v = \frac{c}{s} \tag{2}$$

where c is the speed of light. Thus, by measuring the change in laser frequency, $\Delta v$, needed to cause one oscillation of intensity, the path difference s may be determined. The measurement of z is then based on determining the value of s for each value of x and y, as discussed below.

Improved accuracy in the determination of s is obtained by measuring $\Delta v$ over many oscillation cycles. In practice it is convenient to work in terms of the number of oscillation cycles N (not necessarily a whole number) induced by a total change in frequency B.

N is given in terms of $\Delta v$ and B as:

$$N = \frac{B}{\Delta v} \tag{3}$$

Elimination of $\Delta v$ from Eq. (3) using Eq. (2) yields the following expression for s in terms of N:

$$s = \frac{c}{B} N \tag{4}$$

An uncertainty $\Delta N$ in the measurement of N, corresponds to an uncertainty $\Delta s$ in s of $$\Delta s = \frac{c}{B} \Delta N = s \frac{\Delta N}{N} \tag{5}$$

Equation (5) indicates that if the uncertainty $\Delta N$ to which a single oscillation cycle can be determined remains constant, the uncertainty $\Delta s$ in s is reduced by a factor equal to the number of cycles N that are measured. There are numerous methods for determining N to various levels of resolution $\Delta N$ that are known to those skilled in the art. Examples of methods yielding a resolution of roughly one oscillation-cycle count ($\Delta N=1$) are to perform a fast Fourier transform (FFT) on the data sequence or to count zero crossings of the high-pass filtered signal. Improved resolution of a fraction of an oscillation-cycle count ($\Delta N<1$) can be achieved, for example, by finding the argument of the discrete Fourier transform (DFT) where the magnitude of the DFT is maximized or by inspecting the phase of the oscillation cycle at the ends of the frequency scan. One technique known to those skilled in the art for accurate inspection of the phase is to insert a phase modulator in one leg of the beam path, i.e., between the beam splitter or fiber-optic splitter and one of the sources $P_1$ or $P_2$ in FIGS. 2, 2(*a*), and 2(*b*).

If $I_1$, $I_2$, and $I_3$ are signal intensities corresponding to phase shifts induced by the phase modulator of $-90°$, $0°$, and $90°$, respectively, then the phase $\phi$ of the oscillation cycle is given by:

$$\phi = \tan^{-1}\left(\frac{I_1 - I_3}{2I_2 - I_1 - I_3}\right). \tag{6}$$

For a typical frequency scan of B=15 THz for a tunable diode laser, and for an uncertainty of $\Delta N=1$ cycle, an uncertainty of $\Delta s=20$ $\mu$m is provided. An uncertainty of $\Delta N=0.1$ cycle would improve the uncertainty in s to $\Delta s=2.0$ $\mu$m provided that the spread in s over the lateral resolution is smaller than this quantity. If the spread in s over the lateral resolution on the surface of the object is larger than $\Delta s$, then the improved resolution in the measurement of s may still result in an improved estimate of an average or representative value of s over that lateral resolution.

In terms of the coordinate system:

$$s = \sqrt{(x-x_2)^2 + (y-y_2)^2 + (z-z_2)^2} - \sqrt{(x-x_1)^2 + (y-y_1)^2 + (z-z_1)^2} \tag{7}$$

To make the calculation simpler, assume that the two sources $P_1$ and $P_2$ are located symmetrically about the origin at $(x_1,y_1,z_1)$ and $(-x_1,-y_1,-z_1)$. Then Eq. (7) becomes, in terms of $(x_1,y_1,z_1)$:

$$s = \sqrt{(x+x_1)^2 + (y+y_1)^2 + (z+z_1)^2} - \sqrt{(x-x_1)^2 + (y-y_1)^2 + (z-z_1)^2} \tag{8}$$

Solving for z, Eq. (8) becomes:

$$z = \frac{4(xx_1 + yy_1)z_1 \pm \frac{s}{2}\sqrt{16(xx_1+yy_1)^2 + (s^2 - 4z_1^2)(s^2 - D^2 - 4x^2 - 4y^2)}}{s^2 - 4z_1^2} \tag{9}$$

where D is the distance between the two sources $P_1$ and $P_2$. Thus z is determined to within an ambiguity due to the existence of the positive and negative roots of Eq. (9). One way to avoid this ambiguity is by illuminating the object 10 so that the s=0 line (labeled 16 in FIG. 1 for the case $s_0=0$) does not bisect the region of the object to be imaged. One way of moving the s=0 line is to vary so in Eq. (1).

The sensitivity of the system to changes in s is shown by the ratio of $\Delta s/\Delta z$, where $\Delta z$ is the uncertainty in z introduced by an uncertainty $\Delta s$ in the value of s. This ratio ranges between zero, for a system lacking any practical range sensitivity and two, for a theoretically maximal system. A value of two is impractical to achieve because the surface of the object 10 would have to lie between the two point sources $P_1$ and $P_2$ and only one side of the surface could be illuminated from each beam. The ratio $\Delta s/\Delta z$ is calculated by taking the partial derivative of s with respect to z, from which the following expression for the range resolution is obtained:

$$\Delta z = \Delta s \left( \frac{z + z_1}{\sqrt{R_0^2 + R_0 D\cos\psi + \frac{D^2}{4}}} - \frac{z - z_1}{\sqrt{R_0^2 - R_0 D\cos\psi + \frac{D^2}{4}}} \right)^{-1} \tag{10}$$

In equation (10), $R_0$ is the distance from the origin to $P_0$ and $\psi$ is the angle between the line extending from the origin to the point $P_0$ and the line extending from point $P_1$ to point $P_2$ as shown in FIG. 1. A useful configuration that provides good range resolution is to set $\psi=90°$ for which the expression for $\Delta z$ simplifies to $$\Delta z = \frac{\Delta s}{2\sin\alpha\cos\theta_s} \tag{11}$$

where $\theta_s$ and $\alpha$ are as shown in FIG. 1. In terms of $R_0$ and D, $\tan \alpha = D/(2R_0)$. Equation (11) shows that the range resolution improves as the angle $\alpha$ increases and the angle $\theta_s$ decreases. For values of $\Delta s=5$ $\mu$m, $\alpha=10°$, and $\theta_s=45°$, the range resolution is $\Delta z=20$ $\mu$m.

Uncertainties ($\Delta x$, $\Delta y$) in the lateral position (x, y) of the observation point P also affect the range resolution $\Delta z$. If the two source points lie in the x-z plane, then the measurement of z is insensitive to uncertainties $\Delta y$. For $\psi=90°$, uncertainties $\Delta x$ in x cause an uncertainty $$\Delta z = \Delta x \tan \theta_s \tag{12}$$

in the measurement of z. Therefore, angles near $\theta_s=0°$ offer the best immunity to uncertainty in the lateral position of point $P_0$.

Because the depth of focus decreases as the lateral resolution of the optical system improves, there is a tradeoff between lateral resolution and maximum object depth. One method for reducing this limitation in object depth is to sequentially focus on different range planes and use only those pixels that are within the depth of focus. For example, a 100 $\mu$m lateral resolution would limit the depth of field to the order of 1 cm, and an object with a 10 cm range could be imaged at full resolution by focusing sequentially at ten different ranges. To minimize the effects of depth of field, the z axis can be defined in a direction that minimizes the range extent, i.e., normal to the average plane of the surface of the object. To increase the lateral area that can be imaged without losing lateral resolution, multiple cameras (i.e., detector arrays 22) can be used to cover the entire area of interest of the object 10 or individual cameras can be used for inspecting regions of interest. Alternatively, the focal plane of single lenses can be populated with a plurality of detector arrays. These arrays can be translated independently to inspect various regions of the object at high resolution. Translation of individual detector arrays along the z axis or tilting of the detector arrays can achieve simultaneous focusing for regions of the object at different depths to increase the allowable object depth.

A potential difficulty with the optical imaging system in FIG. 1 is that the bistatic angle between the sources and the detector may introduce shadowing effects. These effects can be reduced by placing the lens closer to the sources as in FIG. 4 and using the lens in an off-axis configuration where the detector is offset laterally in the image plane. If the lens is designed for this purpose or has a sufficiently large field of view, then aberrations resulting from off-axis imaging can be minimized.

Figure 5:
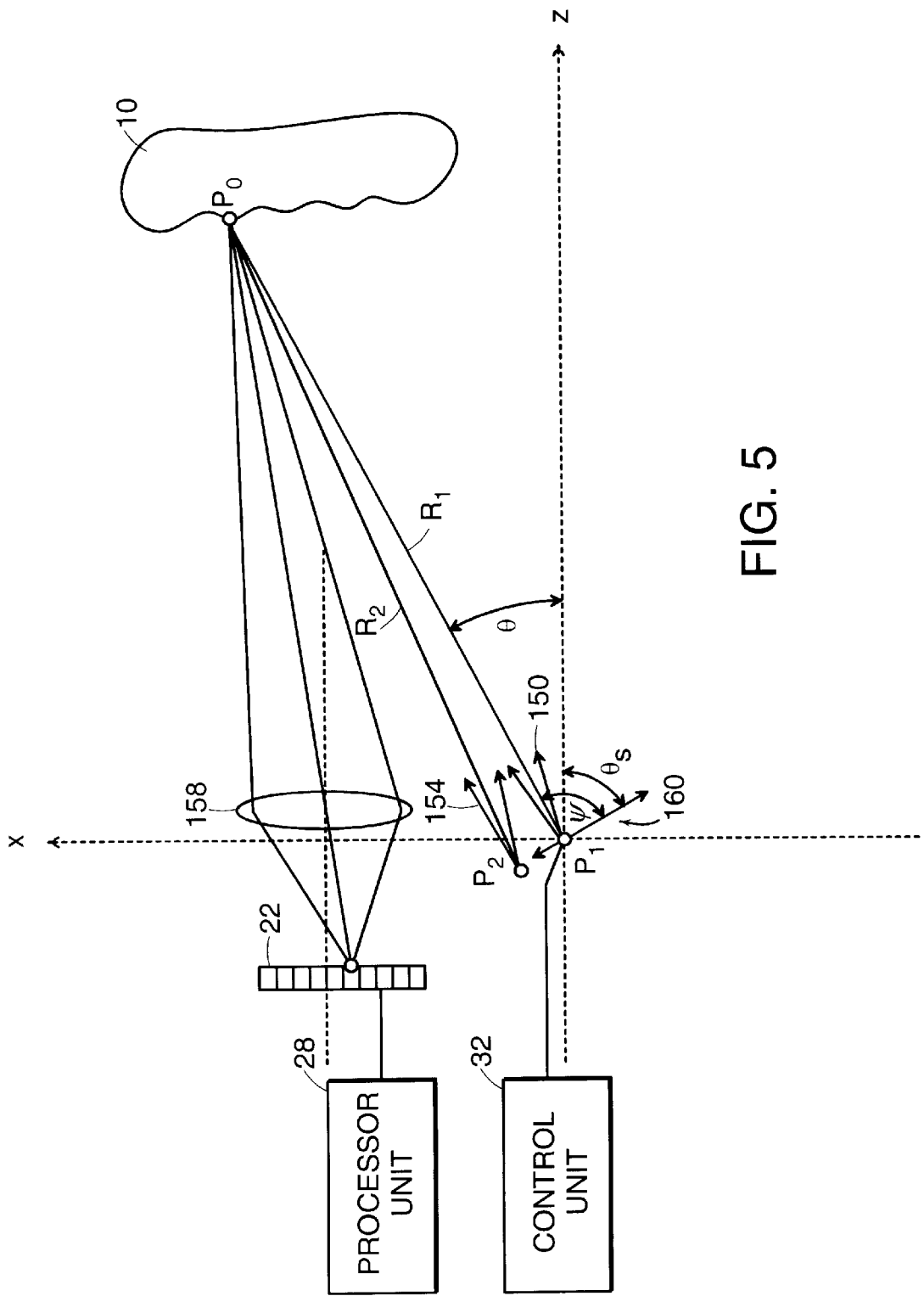
FIG. 5 is a block diagram of an alternate embodiment of the invention for making surface contour measurements.

Referring to FIG. 5, an alternate embodiment of the present invention includes a moveable radiation source $P_1$ and a stationary radiation source $P_2$, each providing a divergent beam 150 and 154 and having a path length labeled $R_1$ and $R_2$ between such radiation source and a point $P_0$ on the surface of an object 10, respectively. The sources $P_1$ and $P_2$ may be generated by any suitable source of coherent radiation, such as a monochromatic laser, which is split to provide the two point sources $P_1$ and $P_2$. Moreover, various techniques are suitable for splitting the radiation from the coherent radiation source, such as the beam splitter embodiments of FIGS. 2 and 2a and the fiber optic splitter embodiment of FIG. 2b.

Figure 4:
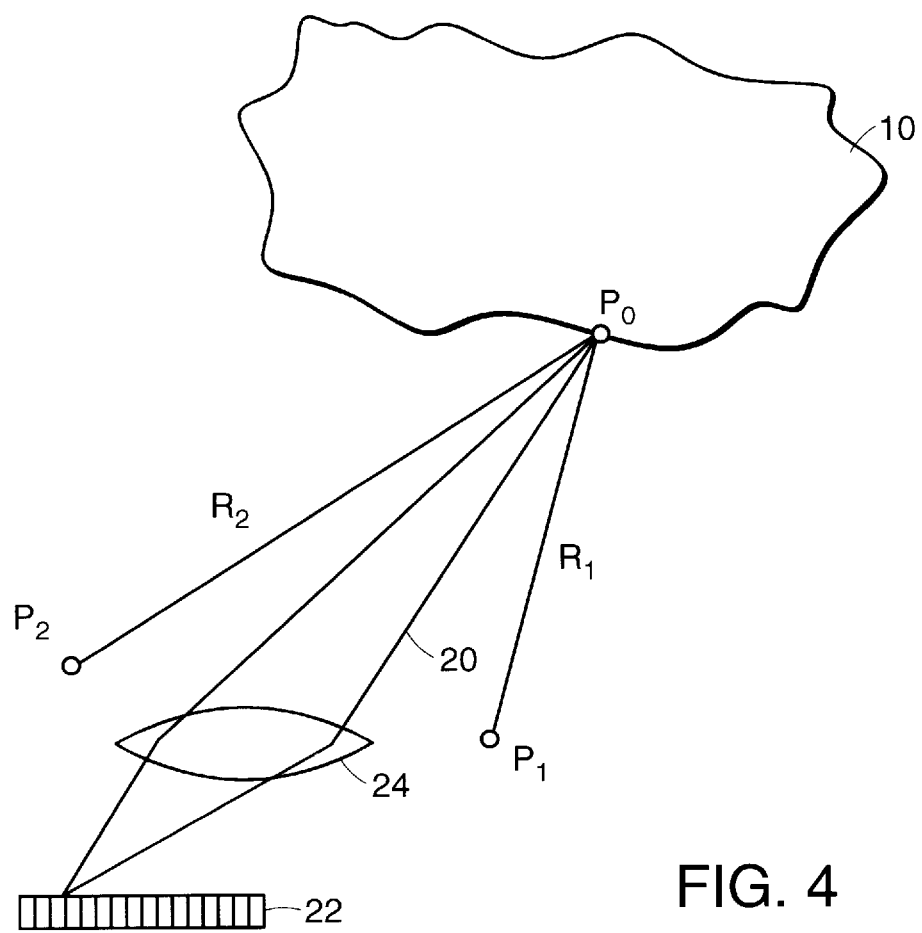
FIG. 4 is another embodiment of the imaging system in FIG. 1.

The divergent beams 150 and 154 are directed toward a surface of an object 10 on which a point $P_0$ is located having position information which is to be measured. Illumination scattered by the surface of the object 10 is focused by a focusing element, or lens 158 to impinge on a detector array 22. The lens can be used in an off-axis configuration as illustrated in FIG. 4 to reduce shadowing effects due to the bistatic angle. An optional polarizer (not shown) of the type described above in conjunction with FIG. 1 may be positioned between the focusing element 158 and the detector array 22 in order to improve the contrast of the speckle image incident on the detector array 22.

The detector array 22 is in communication with a processor unit 28 for processing the image incident on the detector, as will be described. A control unit 32 is in communication with at least the moveable source $P_1$ for moving the source $P_1$ along an axis 160. As noted above, the control unit 32 and the processor unit 28 may be implemented by separate devices or alternatively, may be part of a single system. Additionally, the control unit 32 and the processor unit 28 may communicate with each other, as may be desirable in certain applications.

As described above in conjunction with FIG. 1, the depth coordinate z associated with a point $P_0$ on the surface of the object 10 can be determined as a function of the difference, $R_2-R_1$, between the path lengths $R_1$ and $R_2$ of beams 150 and 154, from sources $P_1$ and $P_2$ respectively, to point $P_0$. In the embodiment of FIG. 5, the phase of the radiation from moveable source $P_1$ is changed by moving the source $P_1$ along the axis 160 under the control of the control unit 32. With this arrangement, oscillations in the intensity at point $P_0$ are produced.

The instantaneous coordinates of moveable point source $P_1$ are $$x_1 = a\, l_s,\ y_1 = a\, m_s,\ \text{and } z_1 = a\, n_s \tag{13}$$

where a represents the magnitude of translation of point source $P_1$, and $l_s$, $m_s$, and $n_s$ are direction cosines representing the direction of translation with respect to the x, y and z axes, respectively. The phase difference of the radiation from the sources $P_1$ and $P_2$ as measured after propagation to point $P_0$ is given by:

$$\phi = \frac{2\pi}{\lambda}(R_2 - R_1) + \phi_0 \tag{14}$$

where $\Phi_0$ represents a constant phase offset that may exist between the two coherent sources $P_1$ and $P_2$. As $P_1$ translates along axis 160, the value of $R_1$ changes, causing $\Phi$ to vary as a function of a.

The number of intensity oscillations that occur at point $P_0$ as point source $P_1$ moves away from the origin is given by:

$$N = \frac{\phi(a) - \phi(0)}{2\pi} = \frac{R_0 - R_1}{\lambda} = \tag{15}$$

$$\frac{1}{\lambda}\left[\sqrt{x^2 + y^2 + z^2} - \sqrt{(x - al_s)^2 + (y - am_s)^2 + (z - an_s)^2}\right]$$

where Ro is the distance between point $P_0$ and the origin of the coordinate system, $\Phi$ (a) is the angle of translation measured at a, and $\Phi(0)$ is the angle of translation measured at 0. Consideration of Eq. (15) reveals that the number of intensity oscillations, N, resulting from movement from source $P_1$ is independent of the location of the stationary source $P_2$. This independence permits the sources $P_1$ and $P_2$ to be positioned in close proximity to one another. With this arrangement, the divergent beams 150 and 154 from respective sources $P_1$ and $P_2$ experience common disturbances, such as air turbulence and vibrations. In this way, the effects of such disturbances are minimized. Additionally, beams 150 and 154 reach the surface of the object 10 with substantially identical polarization.

Since the magnitude of translation a of point source $P_1$ is relatively small as compared to the values of x, y and z, Eq. (15) can be approximated to second order in $a/R_0$ as follows:

$$N = \frac{a}{\lambda}\left[\cos\psi - \frac{1}{2}\sin^2\psi\frac{a}{R_o} - \frac{1}{2}\cos\psi\sin^2\psi\frac{a^2}{R_0^2}\right] \tag{16}$$

where $\psi$ is the angle between the line extending from the origin to the point $P_0$ and the line defined by the direction of translation of $P_1$.

Eq. (16) indicates that to lowest order in $a/R_0$, knowledge of N allows the angle $\psi$ to be determined. Given knowledge of $\psi$ from three or more locations, the (x,y,z) coordinates of PO could be determined through triangulation. We now describe an embodiment similar to the one corresponding to FIG. 1, where the x and y coordinates are determined from location of the image point in the detector array.

The measurement of z for a given (x,y) location can be made either by counting the number of intensity oscillation cycles N that occur as $P_1$ moves over a distance a or by measuring the rate at which such intensity oscillations occur. Consider first a measurement of z based on counting the number of cycles N. With N known, all of the variables in Eq. (15) are known except for z. Solving Eq. (15) for z yields the following expression:

$$z = \frac{An_s \pm \bar{\rho}\sqrt{A^2 - (\bar{\rho}^2 - n_s^2)(x^2 + y^2)}}{\bar{\rho}^2 - n_s^2} \tag{17}$$

where $$A = xl_s + ym_s + \frac{a}{2}(\bar{\rho}^2 - 1) \tag{18}$$

and $$\bar{\rho} = \frac{\lambda N}{a} \tag{19}$$

Equation (19) defines a dimensionless parameter having a magnitude ranging between zero and unity that represents the average modulation rate of the speckle intensity in terms of oscillation cycles N per wavelength unit traveled by $P_1$. For values of a approaching zero, Eq. (17) can be approximated as:

$$z = \frac{(xl_s + ym_s)n_s \pm \overline{\rho}\sqrt{(xl_s + ym_s)^2 - (\overline{\rho}^2 - n_s^2)(x^2 + y^2)}}{\overline{\rho}^2 - n_s^2} \quad (20)$$

The expressions for z in Eqs. 17 and 20 can be simplified by setting $n_s=0$, so that the translation of source $P_1$ is confined to the x-y plane. This arrangement represents a good practical choice for translation of source $P_1$, as described below. The resulting expression for z can be written as follows:

$$z = \sqrt{R_0^2 - x^2 - y^2} \quad (21)$$

where the distance $R_0$ from the scattering point $P_0$ to the origin of the x, y coordinate system is given by the exact expression:

$$R_0 = \frac{xl_s + ym_s + \frac{a}{2}(\overline{\rho}^2 - 1)}{\overline{\rho}} \quad (22)$$

When a is small, $R_0$ can be approximated as:

$$R_0 = \frac{xl_s + ym_s}{\overline{\rho}} \quad (23)$$

Consider now the measurement of z based on knowledge of the instantaneous rate at which the intensity oscillations occur. The instantaneous oscillation rate $\rho$ can be expressed in a manner similar to the average oscillation rate in Eq. (19), as follows:

$$\rho = \lambda \frac{\partial N}{\partial a} \quad (24)$$

Substituting the expression for the number of intensity oscillations, N, from Eq. (15) into Eq. (24) yields:

$$\rho = \frac{xl_s + ym_s + zn_s - a}{\sqrt{(x - al_s)^2 + (y - am_s)^2 + (z - an_s)^2}} \quad (25)$$

where the relation:

$$l_s^2 + m_s^2 + n_s^2 = 1 \quad (26)$$

has been used to simplify the numerator. For small values of a, $\rho$ can be approximated as:

$$\rho \approx \cos\psi - \sin^2\psi \frac{a}{R_0} - \frac{3}{2}\cos\psi\sin^2\psi \frac{a^2}{R_0^2} \quad (27)$$

Solving, Eq. (25) for z yields:

$$z = \frac{O \pm Q}{\rho^2 - n_s^2} \quad (28)$$

where $$O = [xl_s + ym_s + a(\rho^2 - 1)]n_s \quad (29)$$

and $$Q = \rho\sqrt{a(\rho^2 - 1)[2(xl_s + ym_s) - a(l_s^2 + m_s^2)] + (xl_s + ym_s)^2 - (\rho^2 - n_s^2)(x^2 + y^2)} \quad (30)$$

When $n_s=0$, Eq. (29) can be written in the form of Eq. (21), with:

$$R_0 = \frac{\sqrt{a(\rho^2 - 1)[2(xl_s + ym_s) - a] + (xl_s + ym_s)^2}}{|\rho|} \quad (31)$$

For small values of a, Eqs. (28) and (31) can be approximated by Eqs. (20) and (23), respectively, with $\overline{\rho}$ replaced by $\rho$.

In order to estimate range resolution, consider the uncertainty $\Delta z$ in the measurement of z that would be introduced by an uncertainty ($\Delta N$ or $\Delta\rho$) in the quantity being measured. For simplicity, this calculation is based on the approximate expression for N given by Eq. (16). To find $\Delta z$, we take the partial derivative of N (or $\rho$) with respect to z and equate this derivative to the ratio $\Delta N/\Delta z$ (or $\Delta\rho/\Delta z$), to yield:

$$\Delta z = G \frac{R_0}{a} \lambda \Delta N = GR_0\Delta\rho \quad (32)$$

where $$G = \frac{1}{n_s - (ll_s + mm_s + nn_s)n} = \frac{1}{\sin\theta[\cos\theta_s\sin\theta - \cos\theta\sin\theta_s\cos(\phi - \phi_s)]} \quad (33)$$

is a geometrical factor that accounts for the direction of translation and the direction to the scattering point. In the first form for G, $$l = x/R_0, \ m = y/R_0, \text{ and } n = z/R_0 \quad (34)$$

are direction cosines for the Point $P_0$. In the second form for G, $\theta$ and $\Phi$ are the polar and azimuthal angles, respectively, representing the direction from the origin to $P_0$ in a spherical-polar coordinate system. Likewise, the direction of translation of the source point is given by $\theta_s$ and $\Phi_s$.

Consideration of Eq. (32) reveals that range resolution degrades with increasing object distance $R_0$ and improves with increasing magnitude of translation a of source $P_1$. Consideration of Eq. (33) reveals that the geometrical factor G ranges between unity and infinity, where unity corresponds to the best range resolution achievable.

The optimal direction of translation of source $P_1$ for a given scattering-point direction is obtained from Eq. (33) by choosing $l_s$, $m_s$, and $n_s$ such that G is minimized for the given values of l, m and n. Application of this constraint yields:

$$(l_s, m_s, n_s) = \left(-\frac{nl}{\sqrt{1-n^2}}, \frac{-nm}{\sqrt{1-n^2}}, \sqrt{1-n^2}\right) \quad (35)$$

which implies that the optimal translation direction is orthogonal to the line extending from the origin to the scattering point $P_0$ ($\psi=90°$) and lies in the plane of incidence formed by said line and the z axis ($\Phi_s=\Phi$). Substitution of the values in Eq. (35) into Eq. (33) results in:

$$G = \frac{1}{\sqrt{1-n^2}} = \frac{1}{\sqrt{l^2+m^2}} = \frac{1}{\sin\theta} \quad (36)$$

From Eq. (36), it is observed that the best achievable G value of unity occurs when $n=0$ ($\theta=90°$), which implies that the scattering point lies in the x-y plane. It is also observed that the resolution degrades such that G approaches infinity for scattering points lying on the z axis. For example, G=2 for θ=30° and G=5.76 for θ=10°. Although it is not possible to satisfy Eq. (35) for every point in the image without changing the translation direction for each point, the condition for optimal resolution can be approximated by satisfying Eq. (35) for a representative image point.

By Eqs. (25) and (27), the instantaneous modulation rate ρ varies as a function of the offset magnitude a of the translating point. For techniques based on measuring ρ, it is desirable for ρ to vary as little as possible during the scan so that there is nearly a one-to-one correspondence between values of ρ and z. Then standard spectral-analysis techniques can be applied to estimate the value of ρ and determine z. To quantify the degree of nonuniformity in p that occurs during a scan, we define:

$$\chi \approx \frac{\rho(a) - \rho(0)}{\rho(0)} = \frac{\rho(a) - \cos\psi}{\cos\psi} \tag{37}$$

Substitution of the approximate form for ρ from Eq. (27) into Eq. (37) and keeping only the lowest order term containing a, yields:

$$\chi \approx \frac{\sin^2\psi}{\cos\psi} \cdot \frac{a}{R_o} \tag{38}$$

Equation (38) states that the modulation nonuniformity increases linearly in the ratio $a/R_0$ of scan length to object distance. Furthermore, the nonuniformity vanishes when ψ=0° and increases without bound when ψ=90°. We observe, however, that there is no range resolution when ψ=0° because all points on the ψ=0° line have the same modulation rate, regardless of range, i.e., G=∞ in Eq. (33). Therefore, there is a tradeoff between minimizing the nonuniformity and obtaining optimal range resolution.

A reasonable measurement configuration that simultaneously provides good range resolution and reduced modulation nonuniformity is to set $n_s=0$ and to use an off-axis optical system with the offset in the $\Phi_s$ direction, i.e., $\Phi=\Phi_s$. Then Eq. (33) for G reduces to:

$$G = \frac{-2}{\sin(2\theta)} \tag{39}$$

As an illustrative example of the measurement technique, suppose it is desired to image an object that is 200 mm by 200 mm in the x-y plane from a distance of $R_0=1$ m using a laser of wavelength λ=0.7 μm. If $n_s=0$ and the center of the object is located at θ=30° and $\Phi=\Phi_s$, then, by Eq. (39), the geometric factor G will vary between 2.1 and 2.6 over the field of view. By Eq. (32), a translation of a=5 mm will produce a range uncertainty of Δz=80 μm (in the middle of the image) for an uncertainty in the number of oscillations of one-quarter count, i.e., ΔN=0.25. The total number of oscillation counts for the entire scan is N=3600 by Eq. (16). To estimate the modulation nonuniformity at the center of the image, we set ψ=60° in Eq. (38) and obtain X=0.0075 so that there is less than a 1% nonuniformity over the scan. This nonuniformity could be reduced further by introducing slight variations in the scan rate during the scan to compensate for any change in frequency during the measurement.

Figure 6:
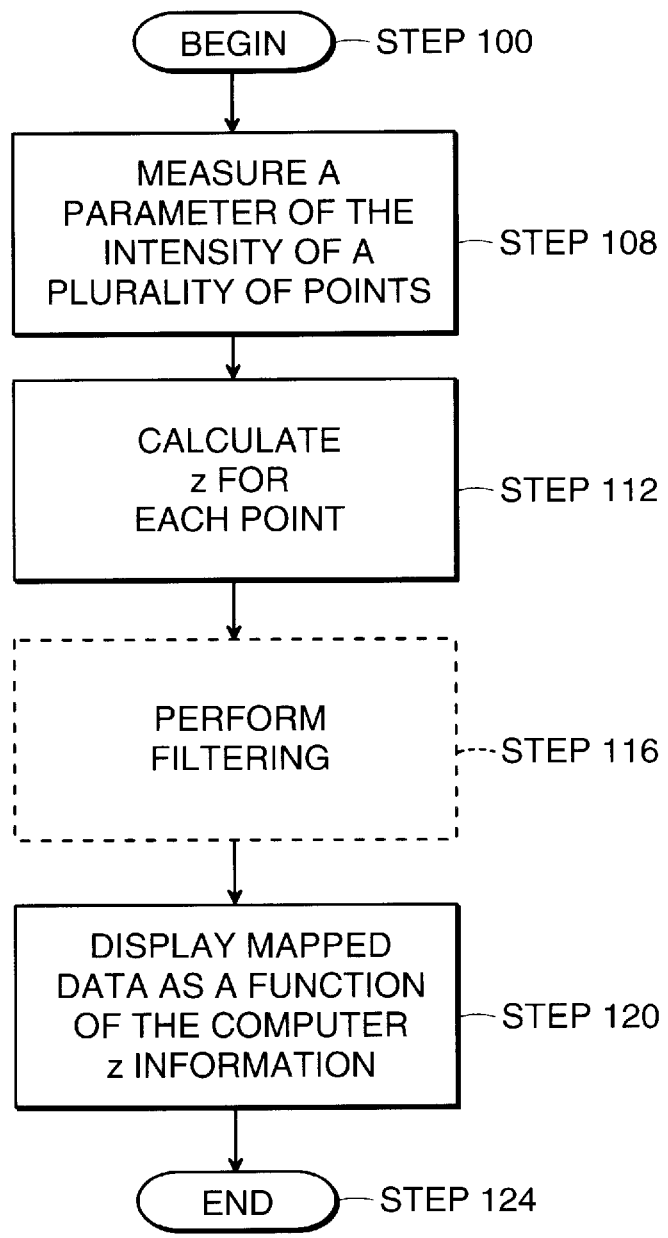
FIG. 6 is a flow diagram of an embodiment of the steps utilized by the processor of FIGS. 1 and 5 in making surface contour measurements.

FIG. 6 depicts an illustrative series of steps to be executed by the processor 28 of FIGS. 1 and 5 to determine the depth coordinate z at each point (x, y) on the object. The processor begins (step 100) by measuring a parameter of the intensity of the radiation scattered by a plurality of illuminated points on the object surface (step 108). From this information, the z coordinate for each measured point is calculated (step 112).

An optional filtering process may be performed in step 116. Suitable filters known to those skilled in the art include, but are not limited to, smoothing filters, median filters and curve-fitting filters. Thereafter, the mapped points can be displayed or output in anyway known to one of ordinary skill in the art, following which the process is terminated in step 124, as shown. In one embodiment, the mapped points are plotted as a function of the computed z information on a mesh plot in step 120.

Figure 6A:
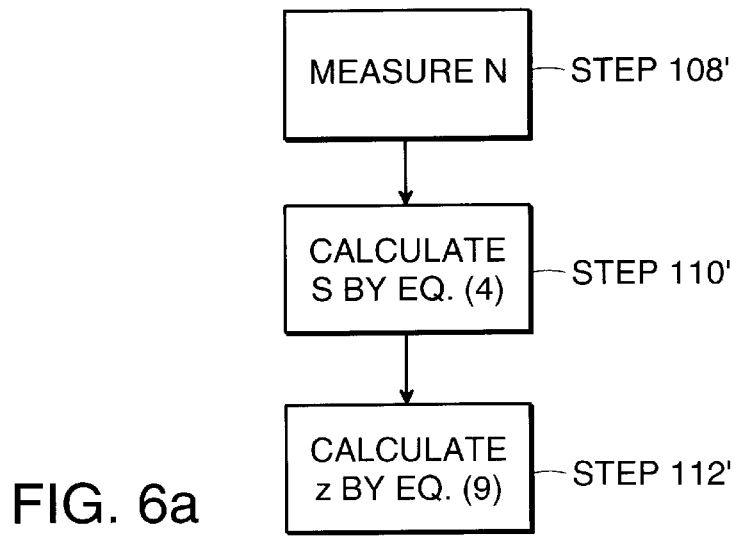
FIG. 6a is one embodiment of a portion of the flow diagram of FIG. 6.

Referring also to FIG. 6a, one embodiment of steps 108 and 112, suitable for use with the embodiment of FIG. 1 is shown. In step 108', the intensity of the scattered illumination is measured as a function of laser frequency offset and N is measured using one of the methods known to those skilled in the art. Thereafter, s is calculated for each location (x,y) in step 110' using Eq. (4) and z is calculated for each location (x,y) in step 112' using Eq. (9).

Figure 6B:
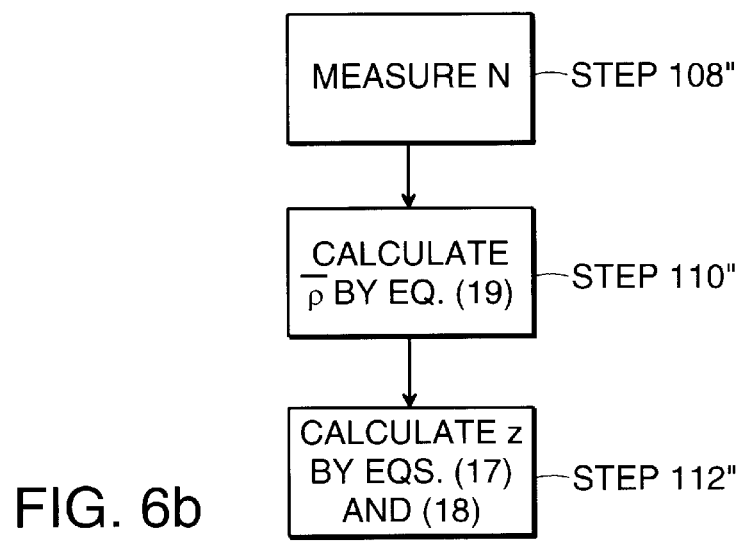
FIG. 6b is another embodiment of a portion of the flow diagram of FIG. 6.
Figure 6C:
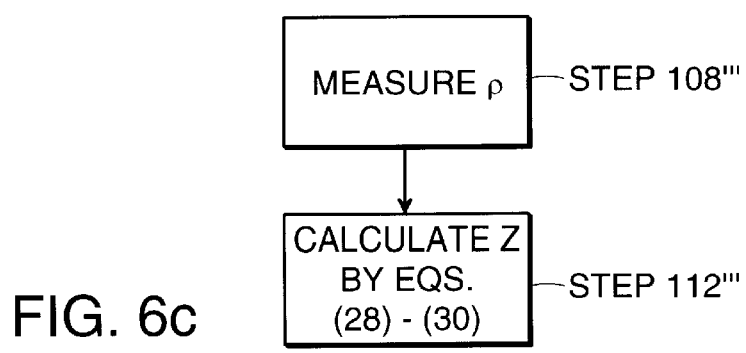
FIG. 6c is yet another embodiment of a portion of the flow diagram of FIG. 6.

An alternate embodiment of process steps 108 and 112 for use in conjunction with the embodiment of FIG. 5 is shown in FIG. 6b. In this case, the parameter of the intensity measured in step 108" is the number of times, N (not necessarily a whole number), that the intensity cycles as the moveable source $P_1$ (FIG. 5) translates. Once N has been determined in step 108" through one of the methods known to be skilled in the art it is converted to $\bar{\rho}$ by Eq. (19) in step 110". z is then calculated in step 112" with the use Eqs. (17) and (18). Another embodiment of process steps 108 and 112 for use in conjunction with the embodiment of FIG. 5 is shown in FIG. 6C. Here, the parameter of the intensity measured in step 108" is the instantaneous oscillation rate ρ at which oscillations occur as the source point $P_1$ translates. ρ is converted to z in step 112''' through Eqs. (28)–(30).

Figure 7:
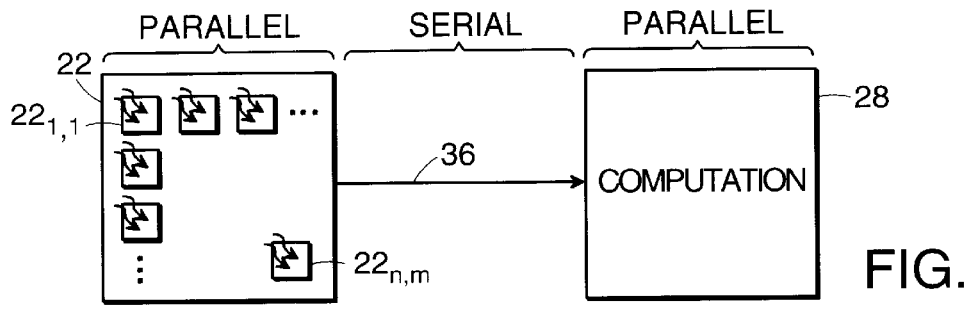
FIG. 7 is a block diagram of one embodiment of a detector and processor arrangement for use with the systems of FIGS. 1 and 5.

Various arrangements of detector 22 and processor 28 are possible. In one embodiment, shown in FIG. 7, the photodetector elements $22_{1,1}$ to $22_{n,m}$ of the detector array 22 are read out serially. The serial output 36 of detector array 22 provides an input to a processor 28. Processor 28 may comprise a single processor or alternatively, may be a multiprocessor comprising a plurality of processors.

Figure 7A:
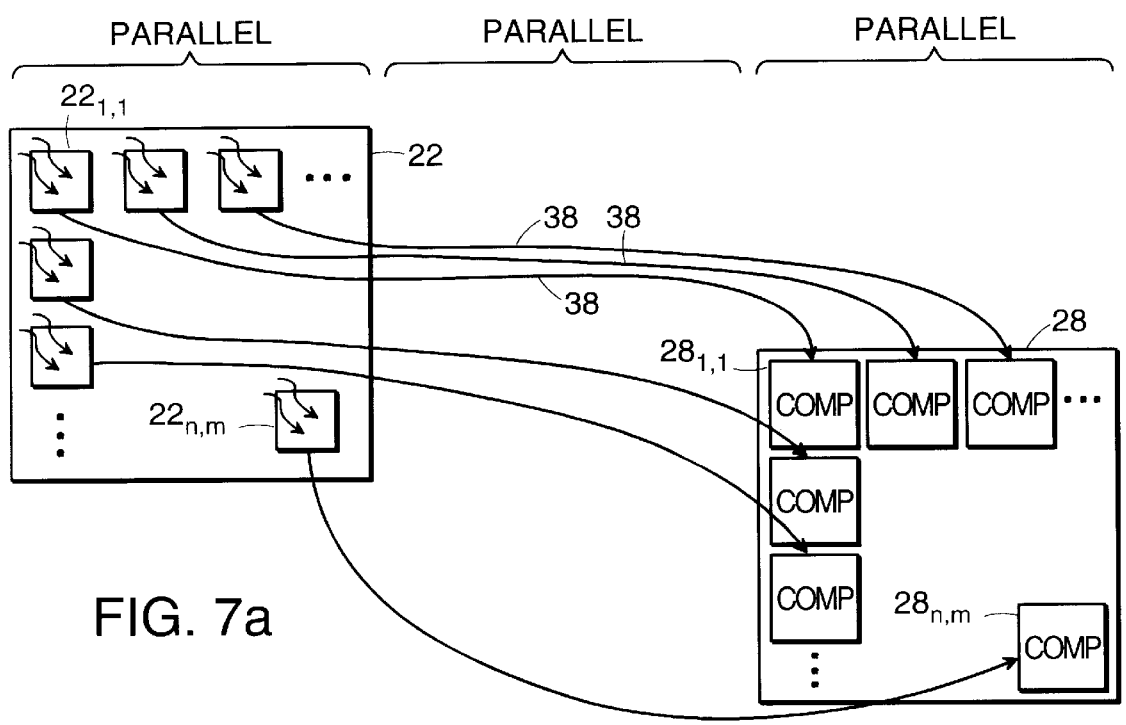
FIG. 7a is a block diagram of an alternate embodiment of a detector and processor arrangement including a multiprocessor for use with the systems of FIGS. 1 and 5.

Referring also to FIG. 7a, an alternate detector and processor arrangement is shown. In this embodiment, the processor 28 is a multiprocessor comprising a plurality of processors $28_{1,1}$ to $28_{n,m}$. Each of the photodetector elements $22_{1,1}$ to $22_{n,m}$ of the detector array 22 provides a respective output signal 38 to a corresponding one of the processors $28_{1,1}$ to $28_{n,m}$. With this arrangement, each of the processors $28_{1,1}$ to $28_{n,m}$ is able to operate substantially simultaneously, in order to provide substantial performance advantages. More particularly, each processor $28_{1,1}$ to $28_{n,m}$ in the multiprocessor unit 28 is responsible for making the z coordinate calculation based upon the data received from the corresponding element $22_{1,1}$ to $22_{n,m}$ of the photodetector array 22. Thus, the z coordinate for each location of the surface of the object 10 may be determined rapidly.

Figure 7B:
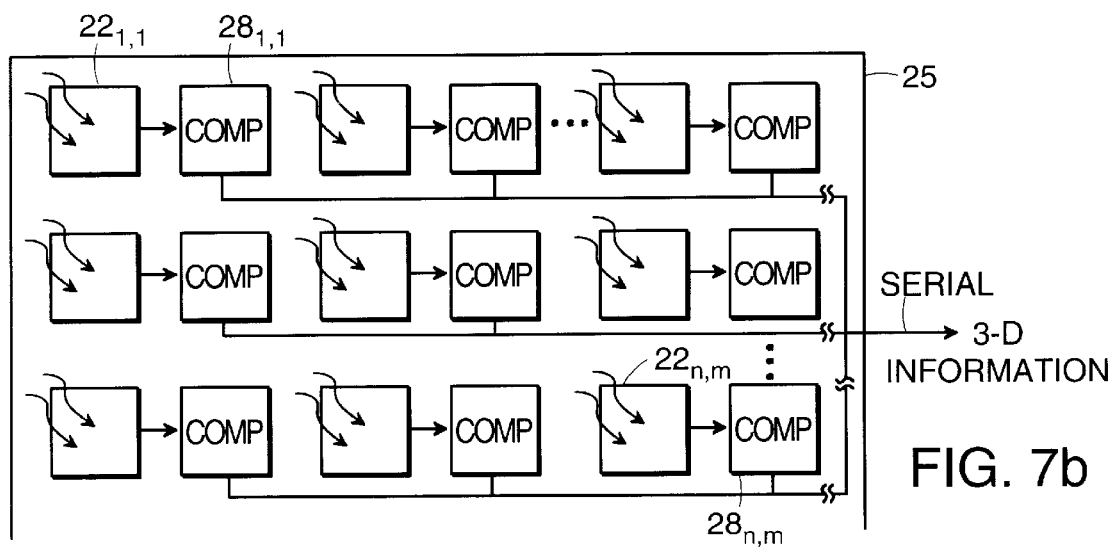
FIG. 7b is a block diagram of another alternate embodiment of a detector and processor arrangement for use in the systems of FIGS. 1 and 5.

FIG. 7b shows a further alternate embodiment of the detector and processor components for use in the systems of FIGS. 1 and 5 in the form of a unitary detector and processor array 25. The array 25 is fabricated on, and supported by, a common substrate or is fabricated as a Multi-Chip Module (MCM) or with Surface Mount Technology (SMT). The detector portion of the array 25 includes photodetector elements $22_{1,1}$ to $22_{n,m}$ and the multiprocessor portion of the array includes processors $28_{1,1}$ to $28_{n,m}$. More particularly, each of the detectors $22_{1,1}$ to 22, is associated with, and positioned adjacent to, a respective one of the processors $28_{1,1}$ to $28_{n,m}$ and provides an input signal to the respective processor, as shown. The processors $28_{1,1}$ to $28_{n,m}$ process the information from the respective detectors $22_{1,1}$ to $22_{n,m}$ substantially simultaneously to provide the determined depth coordinates.

Referring to FIG. 8, another embodiment of the invention includes an array of detectors 22' placed against the surface of the object 10 whose surface contour is to be measured. With this arrangement, rather than observing the light scattered from the point $P_0$ on the surface of the object 10 to determine z, the measurement of the phase shifting of the light is performed directly at the surface of the object. Although not shown, the system of FIG. 8 includes a control unit 28 for controlling sources $P_1$ and $P_2$ and a processor 28 for processing radiation incident on detector 22' as shown and described above in conjunction with FIGS. 1, 5 and 6.

Figure 9:
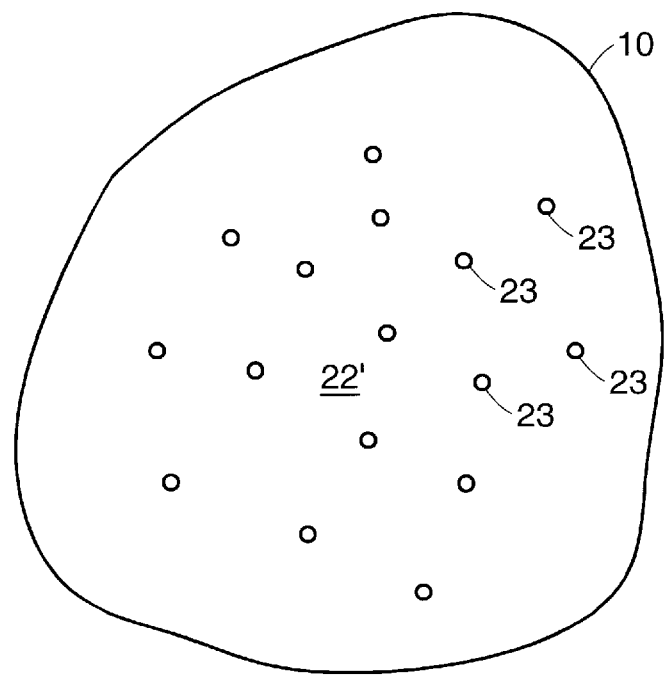
FIG. 9 shows one embodiment of photodetector elements positioned on the surface of an object in accordance with the embodiment of FIG. 8.

The arrangement and mechanism for locating the photodetector elements 23 on the surface of the object 10 may vary. In one embodiment shown in FIG. 9, a plurality of individual photodetector elements 23 of array 22' are positioned on the surface of the object 10 in the area of interest.

Figure 9A:
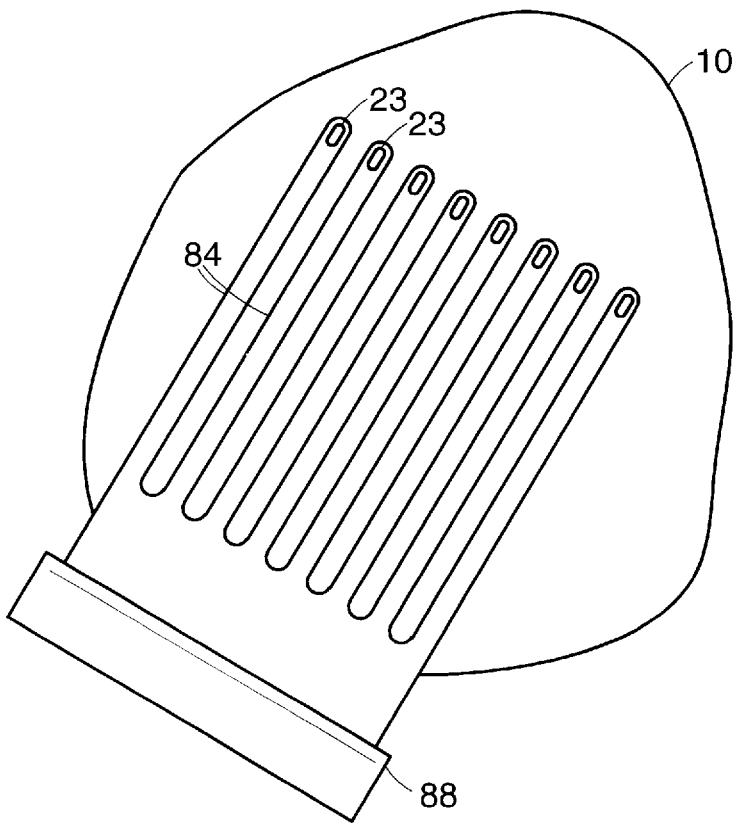
FIG. 9a shows another embodiment of photodetector elements positioned on spring arms for use in the embodiment of FIG. 8.

In another embodiment, shown in FIG. 9a, individual photodetector elements 23 of the array 22' are mounted on spring arms 84 cantilevered from a support and control unit 88. The spring arms 84 are moved over the surface of the object 10 by the control unit 88 in order to contact specific points, or regions of interest. The cantilevered support of spring arms 84 causes each individual detector 23 to remain in contact with a location on the surface of the object 10 as the arms 84 are moved thereover. That is, as the contour of the object surface varies, the spring arms 84 move up and down accordingly.

It will be appreciated that three or more additional radiation sources may be used in apparatus and methods of the present invention. For example, an additional source or sources can be used to determine x,y coordinate information regarding the object or a portion thereof Additionally, extra radiation sources may be used to reduce any processing inaccuracies or ambiguities attributable to shadowing of a region of interest.

It will also be appreciated that other variations to the embodiment involving moving source points may be used. For example, the two points may both move with opposing motion, they may both move in the same direction with constant separation, they may rotate about a common center point, or motion may be simulated by using an array of source points that can be switched on and off by the control system.

Having described and shown the preferred embodiments of the invention, it will now become apparent to one of skill in the art that other embodiments incorporating the concepts may be used and that many variations are possible which will still be within the scope and spirit of the claimed invention. It is felt, therefore, that these embodiments should not be limited to disclosed embodiments but rather should be limited only by the spirit and scope of the following claims.

What is claimed is:

1. A method for determining, on an object having a surface, three-dimensional position information of a point on said surface of said object, said method comprising the steps of:

providing two sources of radiation, said sources being coherent with respect to one another;

illuminating said point with said radiation from each of said sources;

changing the phase of said radiation from one of said sources relative to the phase of said radiation from the other of said sources as measured at said point on said surface of said object;

detecting radiation scattered by said point on said surface of said object; and calculating position information in response to said change in phase of said radiation from said sources and said detected radiation scattered by said point on said surface of said object.

2. The method of claim 1 further comprising the step of imaging said radiation scattered by said point on said surface of said object prior to detecting said radiation scattered by said point on said surface of said object.

3. The method of claim 1 wherein said step of providing two sources of radiation comprises the steps of:

providing a single source of coherent radiation; and dividing said coherent radiation from said single source into two beams of coherent radiation.

4. The method recited in claim 3 wherein said radiation dividing step comprises the step of dividing said coherent radiation with a fiber optic splitter.

5. The method of claim 3 wherein said step of dividing said coherent radiation from said single source into two beams of coherent radiation comprises the step of placing a beam splitter in the path of said coherent radiation from said single source.

6. The method of claim 5 further comprising a pair of mirrors, a first one positioned to reflect a first beam of radiation reflected by said beam splitter and a second one positioned to reflect a second beam of radiation passing through said beam splitter.

7. The method of claim 6 further comprising a focusing element positioned between said source of said coherent radiation and said beam splitter.

8. The method of claim 6 further comprising a first focusing element positioned between said beam splitter and said first mirror and a second focusing element positioned between said beam splitter and said second mirror.

9. The method of claim 1 wherein said step of changing the phase of said radiation from one of said sources relative to the phase of said radiation from the other of said sources as measured at said point on said surface of said object comprises the step of changing the frequency of said sources of radiation.

10. The method of claim 9 wherein said sources of radiation are provided by a tunable laser.

11. The method of claim 1 wherein at least one of said sources of radiation is moveable.

12. The method of claim 9 wherein said sources are tunable and at least one of said sources is moveable.

13. Apparatus for determining, on an object having a surface, position information of a point on said surface of said object, said apparatus comprising:

two sources of radiation positioned to illuminate said point with said radiation from each of said sources, said radiation from a first one of said sources being coherent with respect to said radiation from said other one of said sources;

a control system changing the phase of at least one of said sources of radiation relative to the phase of said radiation from the other of said sources as measured at said point on said surface of said object;

a detector positioned to receive radiation scattered from said point on said surface of said object; and a processor receiving signals from said detector, said processor calculating depth coordinate information in response to said change in phase of said radiation sources and said received radiation scattered from said point on said surface of said object.

14. The apparatus of claim 13 further comprising an imaging system positioned between said detector and said point on said surface of said object, said imaging system imaging said point on said detector.

15. The apparatus of claim 13 wherein said imaging system comprises a lens.

16. The apparatus of claim 15 wherein said detector comprises a CCD array.

17. The apparatus of claim 13 wherein said detector comprises an array of photodetectors.

18. The apparatus of claim 17 wherein said processor comprises a multiprocessor system having a plurality of processing units and said array of photodetectors comprises a plurality of photodetectors, each of said photodetectors sending signals to a respective one of said plurality of processing units.

19. The apparatus of claim 13 wherein said detector comprises a CCD array.

20. The apparatus of claim 16 wherein said processor comprises a multiprocessor system having a plurality of processing units and said CCD array comprises a plurality of CCD elements, wherein a plurality of said CCD elements send signals to a respective one of said plurality of processing units.

21. The apparatus of claim 13 wherein said two sources of coherent radiation comprises a laser providing a beam of coherent radiation and a beam splitter positioned to divide said beam of coherent radiation into two beams of coherent radiation.

22. The apparatus of claim 21 further comprising a pair of mirrors, a first one positioned to reflect a first beam of radiation reflected by said beam splitter and a second one positioned to reflect a second beam of radiation passing through said beam splitter.

23. The apparatus of claim 22 further comprising a focusing element positioned between said source of said coherent radiation and said beam splitter.

24. The apparatus of claim 22 further comprising a first focusing element positioned between said beam splitter and said first mirror and a second focusing element positioned between said beam splitter and said second mirror.

25. The apparatus of claim 21 wherein said laser is frequency tunable.

26. The apparatus of claim 21 wherein said beam splitter comprises an optical fiber arranged to divide said beam of coherent radiation into two beams of coherent radiation.

27. The apparatus of claim 13 further comprising a polarizing filter positioned between said point on said surface of said object and said detector, said polarizing filter oriented to permit radiation scattered by said point on said surface of said object having the same polarization as the coherent radiation illuminating said point on said surface of said object to reach said detector.

28. The apparatus of claim 13 wherein said two sources of coherent radiation comprise two frequency locked lasers.

29. The apparatus of claim 28 wherein each of said frequency locked lasers is frequency tunable.

30. The apparatus of claim 13 wherein said two sources of coherent radiation are located at a fixed distance from one another.

31. The apparatus of claim 13 wherein said two sources of coherent radiation are located at a known distance from one another.

32. A method for determining, on an object having a surface, position information of a point on said surface of said object, said method comprising the steps of:

providing two sources of radiation, with the radiation from said sources being coherent with respect to each other;

providing a detector at said point on said surface;

illuminating said point with said radiation from each of said sources;

changing the phase of said radiation from one of said sources relative to the phase of said radiation from the other of said sources as measured at said point on said surface of said object;

detecting said radiation at said point on said surface of said object; and calculating position information in response to said change in phase of said radiation from said sources and said radiation detected at said point on said surface of said object.

33. The method of claim 32 wherein said step of providing two sources of coherent radiation comprises the steps of:

providing a single source of coherent radiation; and dividing said coherent radiation from said single source into two beams of coherent radiation.

34. The method recited in claim 33 wherein said radiation dividing step comprises the step of dividing said coherent radiation with a fiber optic splitter.

35. The method of claim 33 wherein said step of dividing said coherent radiation from said single source into two beams of coherent radiation comprises the step of placing a beam splitter in the path of said coherent radiation from said single source.

36. The method of claim 32 wherein said step of changing the phase of said coherent radiation from one of said sources relative to the phase of said coherent radiation from the other of said sources as measured at said point on said surface of said object, comprises the step of changing the frequency of said two sources of coherent radiation.

37. The method of claim 36 wherein said sources of radiation are tunable lasers.

38. The method of claim 32 wherein at least one of said sources of radiation is moveable.

39. The method of claim 36 wherein said sources are tunable and at least one of said sources is moveable.

40. Apparatus for determining, on an object having a surface, a depth coordinate of a point on said surface of said object, said apparatus comprising:

two sources of radiation positioned to illuminate said point with said radiation from each of said sources, said radiation from each of said sources being coherent with respect to said radiation from the other one of said sources;

a control system changing the phase of said radiation from one of said sources relative to the phase of said radiation from the other of said sources as measured at said point on said surface of said object;

a detector positioned at said point on said surface of said object to receive radiation illuminating said point on said surface of said object; and a processor receiving signals from said detector, said processor calculating position information of said point on said surface of said object in response to said change in phase of said radiation from said source and said radiation received at said point on said surface of said object.

41. The apparatus of claim 40 wherein said two sources of coherent radiation comprises a laser providing a beam of coherent radiation and a beam splitter positioned to divide said beam of coherent radiation into two beams of coherent radiation.

42. The apparatus of claim 41 further comprising a pair of mirrors, a first one positioned to reflect a first beam of radiation reflected by said beam splitter and a second one positioned to reflect a second beam of radiation passing through said beam splitter.

43. The apparatus of claim 42 further comprising a focusing element positioned between said source of said coherent radiation and said beam splitter.

44. The apparatus of claim 42 further comprising a first focusing element positioned between said beam splitter and said first mirror and a second focusing element positioned between said beam splitter and said second mirror.

45. The apparatus of claim 41 wherein said laser is frequency tunable.

46. The apparatus of claim 41 wherein said beam splitter comprises a optical fiber arranged to divide said beam of coherent radiation into two beams of coherent radiation.

47. The apparatus of claim 40 wherein said two sources of coherent radiation comprises two frequency locked lasers.

48. The apparatus of claim 47 wherein each of said frequency locked lasers is frequency tunable.

49. The apparatus of claim 40 wherein said two sources of coherent radiation are located at a fixed distance from one another.

50. The apparatus of claim 40 wherein said two sources of coherent radiation are located at a known distance from one another.

* * * * *